W. BARTHOLOMEW.
REVERSING MECHANISM.
APPLICATION FILED APR. 29, 1911.

1,171,304.

Patented Feb. 8, 1916.
5 SHEETS—SHEET 4.

Witnesses

Inventor
William Bartholomew
By E. B. Stocking
Attorney

W. BARTHOLOMEW.
REVERSING MECHANISM.
APPLICATION FILED APR. 29, 1911.
1,171,304.
Patented Feb. 8, 1916.
5 SHEETS—SHEET 5.
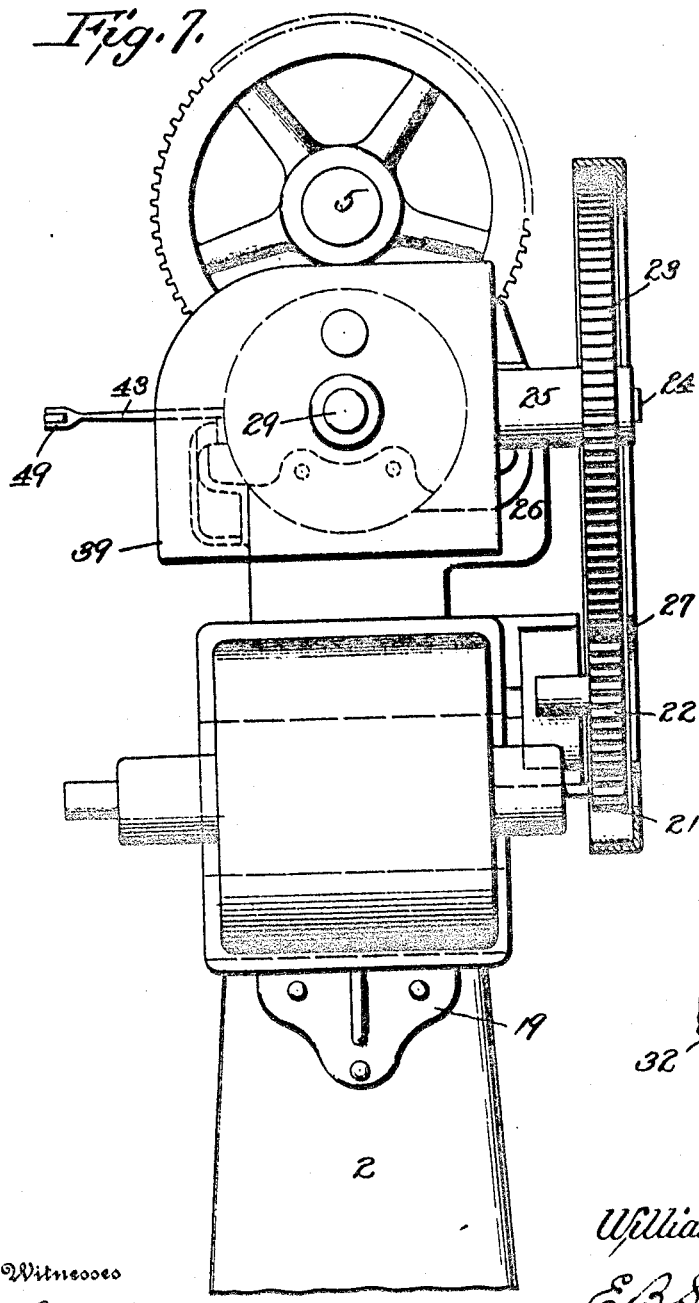
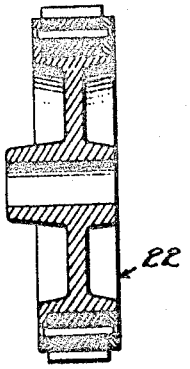
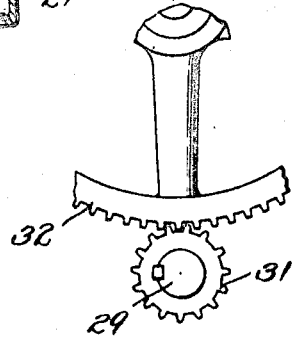
Witnesses
Inventor
William Bartholomew
E B Stocking
Attorney

UNITED STATES PATENT OFFICE.

WILLIAM BARTHOLOMEW, OF CHICAGO, ILLINOIS, ASSIGNOR TO THE TROY LAUNDRY MACHINERY COMPANY, LIMITED, OF CHICAGO, ILLINOIS, A CORPORATION OF NEW YORK.

REVERSING MECHANISM.

1,171,304.

Specification of Letters Patent.

Patented Feb. 8, 1916.

Application filed April 29, 1911. Serial No. 624,126.

*To all whom it may concern:*

Be it known that I, WILLIAM BARTHOLOMEW, a citizen of the United States, residing at Chicago, county of Cook, State of Illinois, have invented certain new and useful Improvements in Reversing Mechanism, of which the following is a specification, reference being had therein to the accompanying drawing.

This invention relates to certain new and useful improvements in reversing mechanism for all kinds of machinery wherein it is desired to reverse the driving parts of the machine without reversing the motor, the object being to provide novel means for accomplishing this result whereby the rotating parts of the machine can be quickly reversed.

Another object of the invention is to provide a driving and reversing mechanism wherein the parts to be driven can be reversed without any danger of stripping the gears and one in which the same is under the control of the operator in such a manner that it is only necessary to operate a treadle for reversing the machine.

A further object of the invention is to provide a driving and reversing mechanism in which the parts to be driven will be rotated through the medium of gears in the desired direction until the reversing mechanism is operated by the treadle which is spring actuated in such a manner that when the treadle is released after being operated to reverse the machine, the parts will be returned to their original position.

A still further object of the invention is to provide a reversing mechanism which is especially adapted to be used in connection with an ironing machine which is driven by an electric motor whereby the disadvantages now existing in reversing the motor are overcome.

Another object of the invention is to provide a reversing mechanism which is exceedingly simple, the parts being so arranged and connected that all danger of the parts getting out of order when in operation is prevented.

Other and further objects and advantages of the invention will be hereinafter set forth and the novel features thereof defined by the appended claims.

Figure 1:
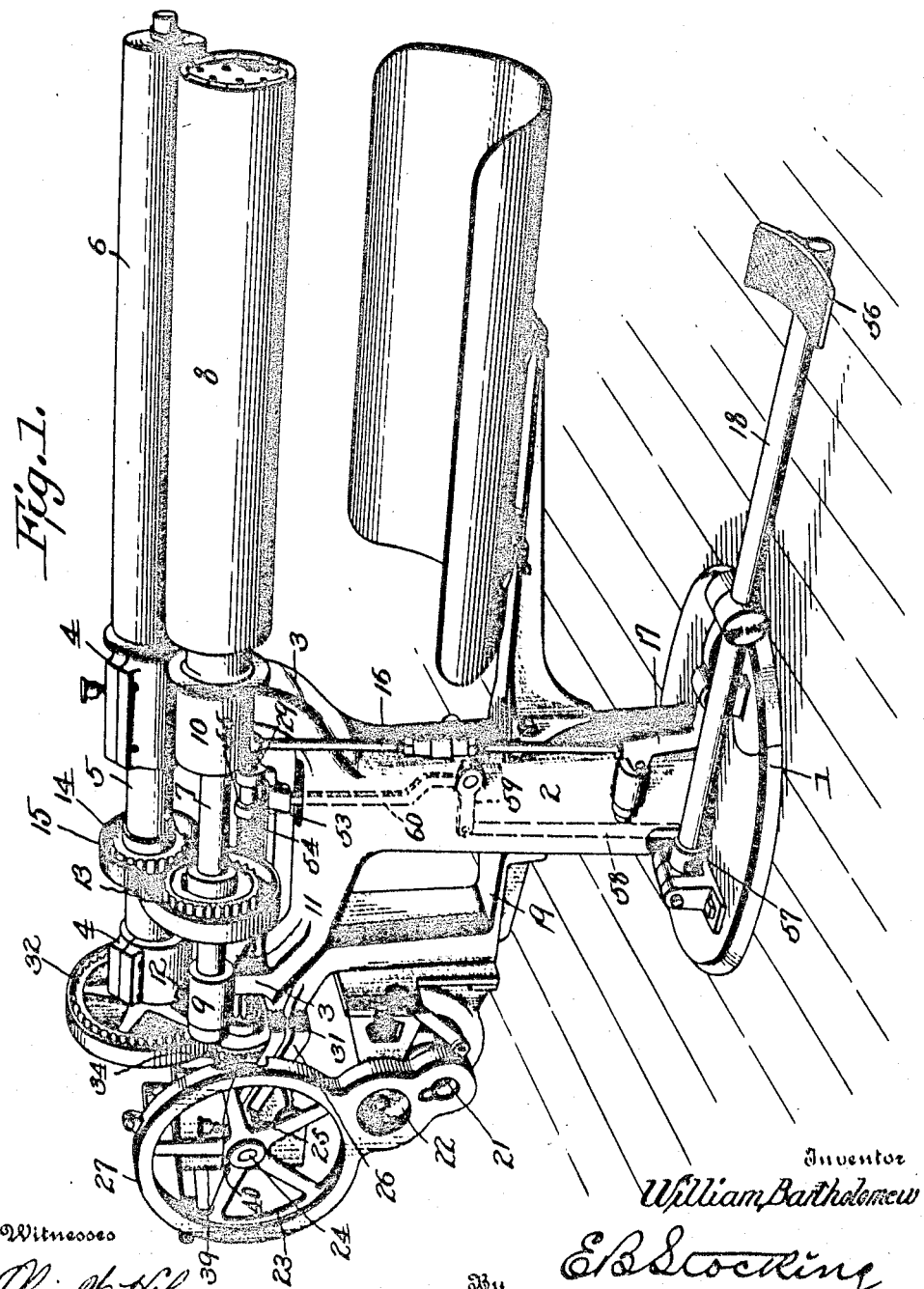
Figure 2:
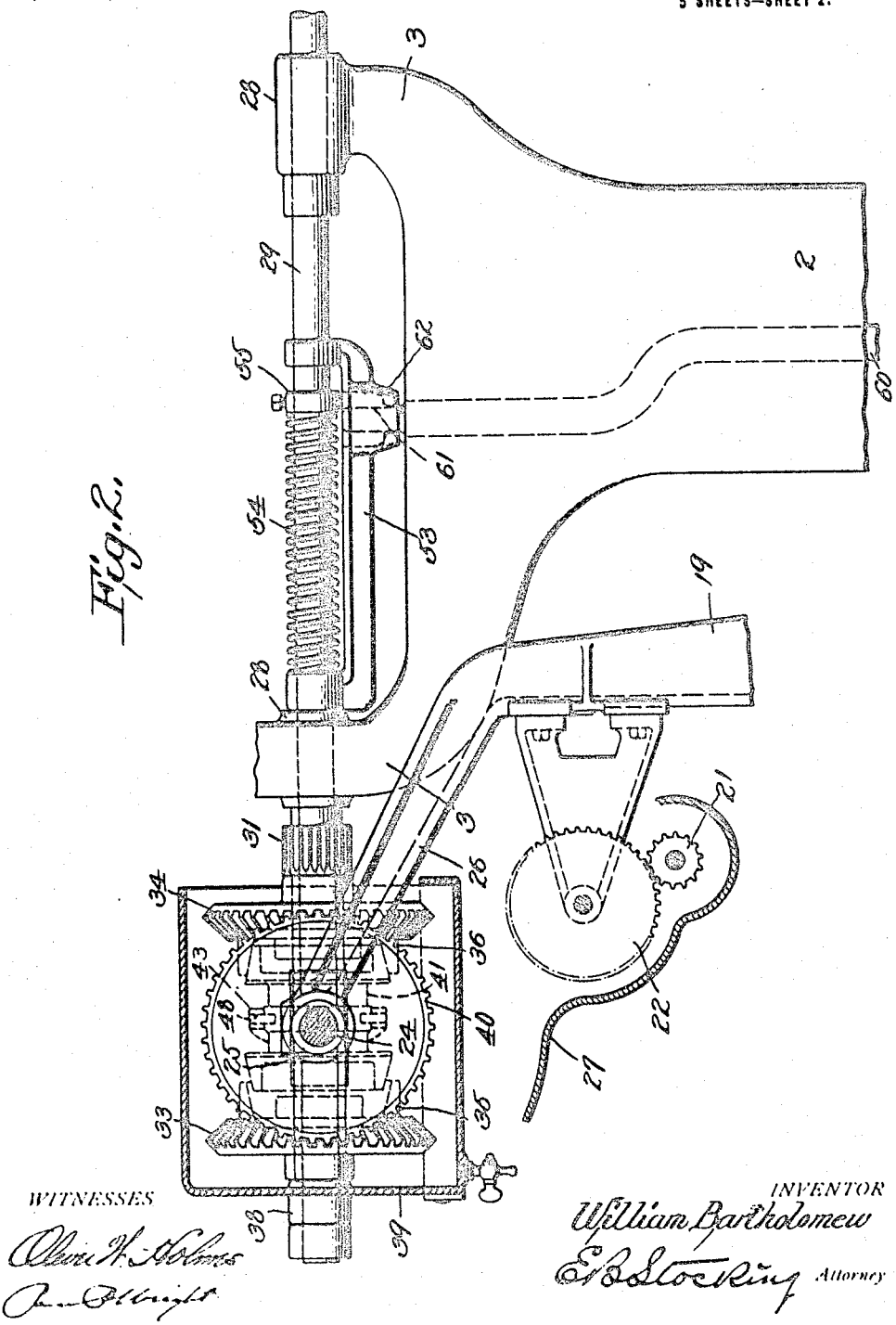
Figure 3:
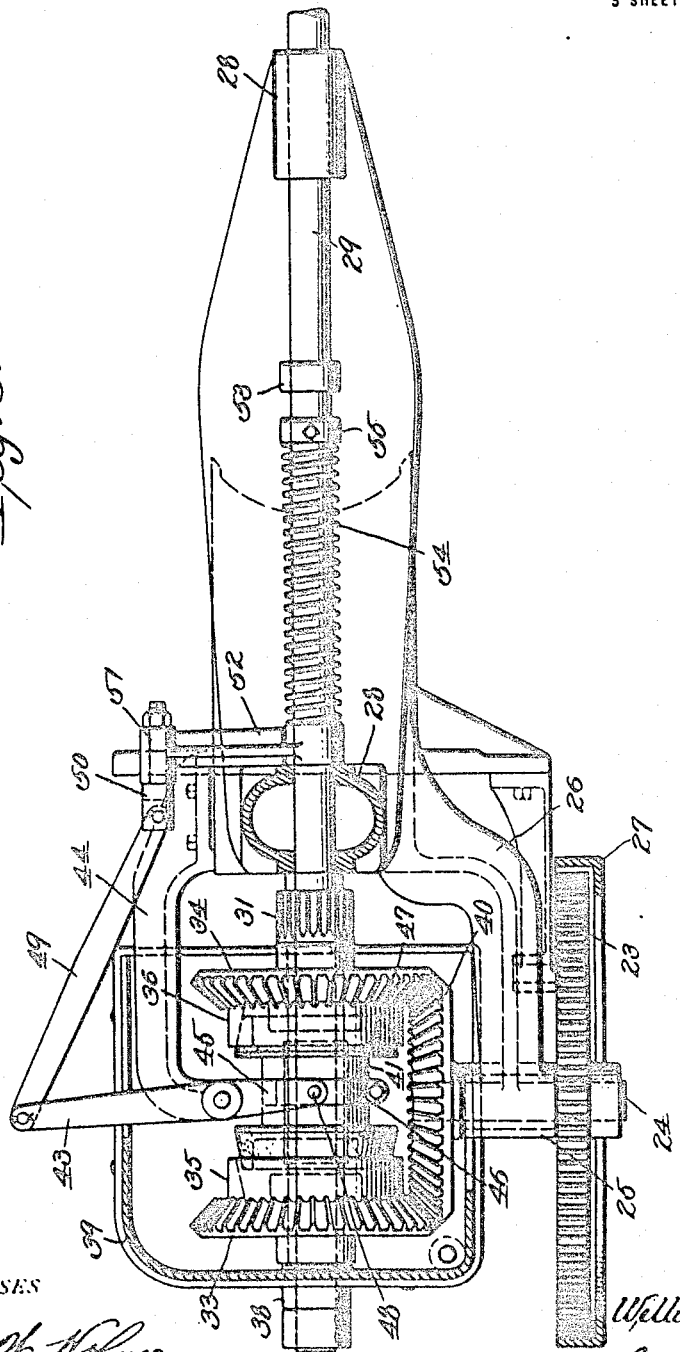
Figure 4:
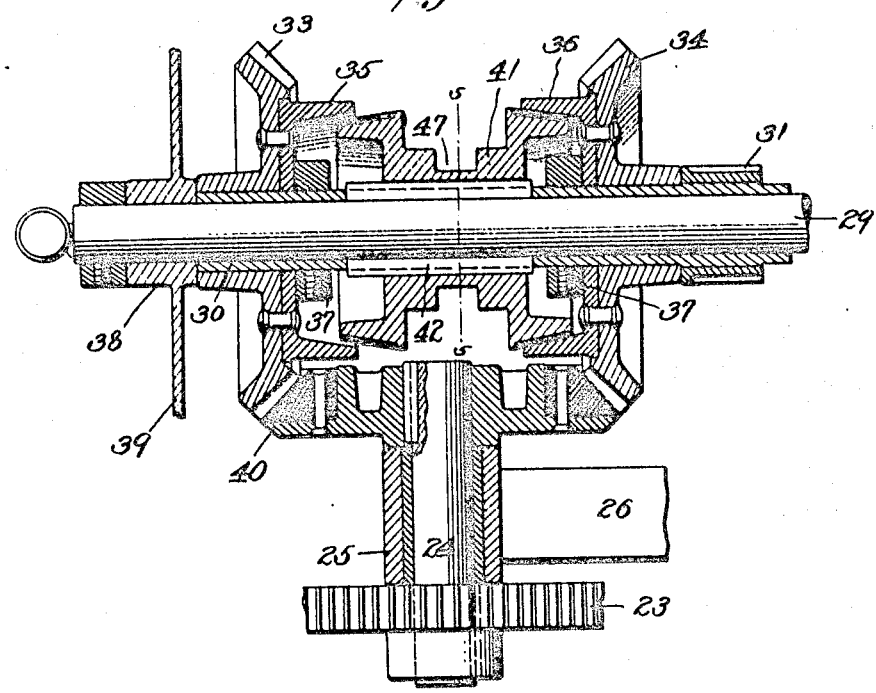
Figure 5:
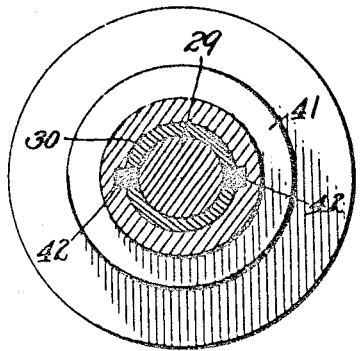
Figure 6:
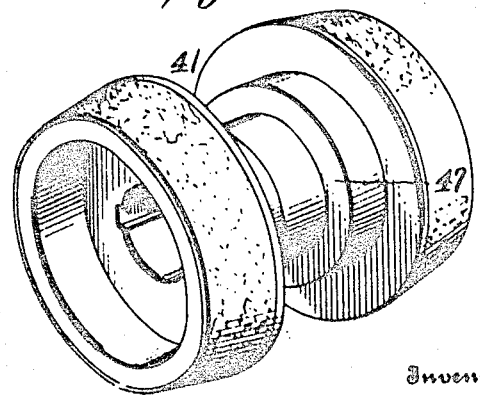

In the drawings Figure 1 is a perspective view of a body ironer showing the application of my improved driving and reversing mechanism connected thereto; Fig. 2 is a detail enlarged side elevation, partly broken away, of the mechanism; Fig. 3 is a horizontal enlarged section showing the reversing mechanism; Fig. 4 is a longitudinal horizontal section through the driving and clutch members of the reversing mechanism; Fig. 5 is a section taken on line 5—5 of Fig. 4; Fig. 6 is a perspective view of the male clutch member detached; Fig. 7 is an end elevation of the ironing machine partly broken away to show the connection between the motor and the reversing mechanism; Fig. 8 is a section through one of the driving gears; and Fig. 9 is a detail view of the driving gears.

Like numerals of reference refer to like parts in the several figures of the drawings.

In the drawings, I have shown my improved driving and reversing mechanism applied to a body ironing machine of the ordinary construction in which 1 indicates the base, 2 the standard having arms 3 provided with bearing boxes 4 in which the shaft 5 of the heated roll 6 is mounted. Parallel to the shaft 5 of the heated roll 6 is a shaft 7 of the clothed roll 8 which is mounted in bearings 9 and 10 pivotally supported by arms 11, in the same manner as shown in my prior patent issued to me September 10, 1907, #865,753, the upward movement of which is limited by a stop-screw 12. The shaft 7 is provided with a gear 13 adapted to mesh with a gear 14 carried by the shaft 5 when the rolls are in contact with each other, the gears being inclosed by a casing 15. The rolls are forced into contact with each other by an operating rod 16 controlled by an auxiliary lever 17 of a treadle mechanism 18 as disclosed in my Patent No. 940,659, granted November 23, 1909, the above description of the ironing machine being given so that the operation of my improved reversing mechanism thereto can be readily understood.

Secured to the standard 2 is a rearwardly extended supporting arm 19 carrying an inclosed electric motor having a driving pinion 21 which meshes with an intermediate pinion 22 which, in turn, meshes with a master gear 23 carried by a driving shaft 24 mounted in a suitable bearing 25 formed on the end of an extension arm 26 of the supporting arm 19. The gears 21, 22 and 23 are inclosed by a casing 27, as clearly shown, so as to protect the same and this casing may be supported by any suitable means but is herein shown as supported by arms extending from the motor base.

Mounted in suitable bearings 28 formed in the arms 3 under the rolls of the machine is a shaft 29 which has a driven sleeve 30 loosely mounted thereon carrying a pinion 31 which is keyed thereto as clearly shown and meshes with a drive gear 32 fixed on the shaft 5 of the heated roll 6, said gear being inclosed by a casing. Loosely mounted on the driven sleeve 30 are spaced beveled gears 33 and 34 having opposing female clutch members 35 and 36, the longitudinal movement of said gears being limited by collars 37 fixed on the sleeve. The bearing hubs of the gears 33 and 34 engage the bearing 38 of the casing 39 and the pinion 31, respectively, so as to hold the gears in their proper positions in respect to each other.

Meshing with the gears 33 and 34 is a beveled gear 40 carried by the shaft 24 by means of which the gears 33 and 34 are constantly rotated when the motor is in operation. In order to reverse the movement of the rolls of the ironing machine, a double male clutch member 41 is keyed on the sleeve 30 with oppositely disposed keys 42 to allow the clutch member to move longitudinally upon the sleeve so as to engage one of the female clutch members and disengage the other clutch member whereby the sleeve will be rotated in either direction so as to cause the pinion 31 to drive the gear 32. The clutch members 35 and 36 are herein shown conical and the male member correspondingly shaped as I have found this form of clutch more practical but it is, of course, understood that any form of clutch may be employed.

In order to shift the double clutch member 41 into engagement with either of the female clutch members, I provide a shifting mechanism which comprises a pivoted lever 43 mounted on an arm 44 extending from the standard of the machine, said lever having a forked end 45 which straddles a ring 46 mounted in an annular groove 47 of the male member 41 and is pivotally connected thereto as shown at 48. The outer end of the lever 43 is connected to a link 49, the free end of which is connected to an adjusting bolt 50 mounted in a bearing 51 of a laterally extending arm 52 of a yoke 53 which is slidably mounted upon the shaft 29 and is normally held in the position shown by a coiled spring 54 mounted upon the shaft 29, the tension of which is adjusted by a collar 55 which is secured in position by a set-screw as clearly shown. The coiled spring 54 normally holds the shifting lever in the position shown so that the machine will be driven in one direction and by this construction, when the treadle mechanism is operated to reverse the rotation of the ironing machine and then released, the spring will return the same to its original position.

The treadle mechanism 18, as herein shown, is substantially the same as that shown in my patent and is provided with a foot piece 56 for rotating the treadle in the bearing and is provided with a crank arm 57 which is connected to an operating bar 58 pivotally connected at its upper end to the arm 59 of the shifting lever 60 which is provided with a reduced upper end 61 loosely mounted in a bearing 62 carried by the yoke 53 and it will be seen that by this construction, the ironing machine may be quickly reversed by operating the treadle mechanism thereby enabling the operator to have perfect control of the ironing machine at all times either in respect to the driving mechanism or the control of the ironing rolls of the machine.

In the drawing, I have shown a specially constructed gear with raw-hide teeth in order to reduce the noise as much as possible in operation and to decrease the frictional engagement of the surface of the parts of the machine.

Having described my invention and set forth its merits what I claim and desire to secure by Letters Patent is—

1. The combination with a pair of separable rotating members, of a driven shaft, a driving connection between said members, driving members loosely mounted upon said driven shaft, clutch members carried by said driving members, a double co-acting clutch member keyed on the driven shaft and capable of moving longitudinally thereon into and out of engagement with the clutch members of the driven shaft, a lever for shifting said clutch member, a spring-actuated yoke, a link connecting said lever to said yoke, mechanism for shifting one of said separable members in respect to the other member, and a compound treadle mechanism for actuating said yoke and mechanism.

2. In a machine, the combination with coöperating members, of a driven member for operating said coöperating members, driving members loosely mounted thereon, means for locking either of said driving members thereto, a lever for shifting said means, a spring actuated yoke for operating said lever, and a treadle mechanism for controlling said yoke.

3. The combination with a bearing shaft, of a tubular driven member mounted thereon, a driving pinion carried by said tubular member, spaced driving members loosely mounted on said driven member having female clutch members, a double male clutch member keyed to the driven member for locking either of said driving gears to the driven member, a collar carried by said male clutch member, a lever connected to said collar, a spring actuated yoke mounted upon said bearing shaft, having an arm extending laterally therefrom, a link connected to said lever having adjustable connection with said arm, and a treadle mechanism for actuating said yoke.

4. The combination with a gear to be driven, of a driven member carrying a pinion meshing with said gear, driving members loosely mounted on said driven member, female clutch members carried by said driving members, a male clutch member keyed to the driven member and normally held in engagement with one of the female clutch members, means for moving said movable clutch member out of engagement with one clutch member and into engagement with the other and a treadle mechanism for actuating said means.

5. The combination with a driven member, of driving members mounted on said driven member having clutch members, a co-acting clutch member keyed to the driven member, a lever for shifting said last mentioned clutch member, a spring actuated yoke provided with an arm, a link connected to said lever adjustably connected to said arm, and a treadle mechanism for reciprocating said yoke.

6. The combination with a gear to be driven, of a driven member carrying a pinion meshing with said gear, driving gears loosely mounted on said driven member, female clutch members carried by said driving members, a double male clutch member keyed to the driven member co-acting with the female members, a driving shaft, a gear carried by said driving shaft engaging the driving gears for rotating the driving members in opposite directions, a lever for shifting said male clutch member, a sliding member for actuating said lever, and a treadle mechanism for actuating said sliding member.

7. The combination with a bearing shaft, of a tubular driven member mounted on said bearing shaft, driving gears loosely mounted on said driven member, a driving shaft, a gear carried by the driving shaft meshing with the driving gears for rotating the driving gears in opposite directions, a slidably mounted member carried by said driven member for locking either of the driving members to the driven member, a lever for actuating said slidably mounted member, a link connected to said lever, a spring actuated yoke connected to said link, and means for actuating said yoke.

8. The combination with a driven member, of a gear to be driven, a pinion carried by the driven member meshing with said gear, oppositely rotating driving members carried by the driven member, a locking member carried by the driven member for locking either of said driving gears, a lever for shifting said locking member, a spring actuated yoke connected to said lever by a link for holding said locking member in locked position with one of said driving gears, and a treadle mechanism for actuating said yoke.

9. In a machine of the kind described, the combination with a pair of separable cooperating rotating members, of a member for driving one of said rotating members, a driving shaft carrying a gear, a driven shaft arranged at right angles to said driving shaft, driving gears loosely mounted upon said driven shaft meshing with said gear, female cone clutch members carried by said driving gears, a cooperating male cone clutch member slidably mounted upon said driven shaft, a spring-actuated member for normally holding said male clutch member into engagement with one of the female clutch members, and a treadle mechanism for shifting one of said rotary members in respect to the other rotary member and actuating said spring-actuated member.

10. In a machine, the combination with separable shafts carrying cooperating rotary members, one of said shafts being capable of moving in respect to the other shaft, contacting gears carried by said shafts, a gear carried by one of said shafts, a driven member carrying a pinion engaging said gear, gears loosely mounted on said driven members provided with clutch members, a driven shaft carrying a gear meshing with said driven gear, a clutch member carried by said member for locking either of said gears to said driven member, a link for shifting said member, a spring actuated member connected to said lever by a link, and means for actuating said spring member against the tension of said spring.

11. In a machine, the combination with a fixed shaft of a movable shaft having meshing gears, a gear carried by one of said shafts, a bearing shaft, a tubular driven member mounted on said shaft, a pinion carried by said driven member meshing with said gear, gears loosely mounted upon said driven member, a drive shaft carrying a gear meshing with the driven gears, female clutch members carried by said driven gears, a male clutch member carried by said member for locking either of said driven gears to said driven member, and treadle mechanism adapted to shift the movable shaft in respect to the fixed shaft and simultaneously operate the male clutch member.

12. A driven member, spaced driving members mounted thereon, means for driving said driving members in opposite directions, means for locking either of said driving members on said driven member, a pivoted lever for operating said means, a link connected to the free end of said lever, a spring actuated slidably mounted yoke, an arm extending from said yoke, an adjustable connection between said arm and link, and a treadle mechanism having a connection with said yoke.

13. In a reversing mechanism, the combination with separable shafts, gearing for rotating said shafts, a motor adapted to rotate in one direction, reversing mechanism connected intermediate the motor with said gearing, a lever for operating said reversing mechanism, a link connected to said lever, a spring actuated yoke, an adjustable connection between said yoke and link, and a treadle mechanism having a connection with said yoke and with said movable shafts for simultaneously operating said reversing mechanism with the separating of said shafts.

14. In a machine of the kind described, the combination with a pair of separable coöperating rotating members, of a gear for rotating one of said members, coöperating gears carried by said rotating members, reversing mechanism coöperating with said driving gear, lifting mechanism for operating one of said members, and a compound treadle for controlling said lifting mechanism and reversing mechanism.

15. In a machine of the kind described, the combination with a pair of separable coöperating rotating members, of a shaft, a spring-actuated yoke mounted upon said shaft provided with an arm, an adjusting bolt carried by said arm, driving mechanism for operating said rotating members, a lever control for said driving mechanism having a connection with said adjusting bolt, an operating rod having a connection with one of said separable members, and a compound treadle mechanism having a connection with said operating rod and yoke.

16. The combination with a horizontally disposed bearing shaft, of a tubular driven member mounted on said shaft adjacent one end, a pinion carried by said tubular member at one end thereof, spaced driving members loosely mounted upon said driven member having female clutch members, a gear meshing with said pinion, a double male clutch member keyed to the driven member for locking either of said driving gears to the driven member, a yoke slidably mounted upon said bearing shaft, a spring surrounding said shaft, bearing against said yoke, an arm extending laterally from said yoke, a pivoted lever having connection with the double male clutch member, a link connecting said pivoted lever to the arm of said yoke, and a treadle mechanism having a connection with said yoke.

17. The combination with a gear to be driven, of a driven tubular member carrying a pinion meshing with said gear, a bearing shaft for said tubular member, driving members loosely mounted upon said driven member, female clutch members carried by said driving members, a male clutch member keyed to the driven member, a lever for shifting said male clutch member into engagement with either of said female clutch members, a yoke mounted upon said bearing shaft having a laterally extending arm, a link connected to said lever having an adjustable connection with said arm, a spring surrounding said bearing shaft engaging said yoke, a socket formed in said yoke, and a treadle mechanism having a shifting lever extending into the socket of said yoke.

In testimony whereof I affix my signature in presence of two witnesses.

WILLIAM BARTHOLOMEW.

Witnesses:
WM. CROGMAN,
JNO. HOERMANN.